United States Patent [19]

Wegerhoff et al.

[11] 4,332,601

[45] Jun. 1, 1982

[54] METHOD FOR MAKING SILICA FIBERS

[75] Inventors: Arno Wegerhoff, Wörth am Main; Hans Zengel, Kleinwallstadt; Walter Brodowski, Amorbach; Heinz Beck, Düren; Ernst Seeberger, Düren; Gerhard Steenken, Düren; Karlheinz Hillermeider, Wuppertal, all of Fed. Rep. of Germany

[73] Assignee: Akzo N.V., Arnhem, Netherlands

[21] Appl. No.: 162,400

[22] Filed: Jun. 23, 1980

Related U.S. Application Data

[62] Division of Ser. No. 110,002, Jan. 7, 1980.

[30] Foreign Application Priority Data

Jan. 12, 1979 [DE] Fed. Rep. of Germany ....... 2900990
Jan. 12, 1979 [DE] Fed. Rep. of Germany ....... 2900991
Nov. 7, 1979 [DE] Fed. Rep. of Germany ....... 2944864

[51] Int. Cl.³ ............... C03C 25/06; C03C 15/00; B44C 1/22

[52] U.S. Cl. ............................................. 65/2; 65/31; 156/663; 423/335

[58] Field of Search .................. 65/2, 31; 156/663; 423/335

[56] References Cited

U.S. PATENT DOCUMENTS 2,338,463  1/1944  Skaupy et al. ................. 423/333
4,200,485  4/1980  Price ............................... 65/31 X

*Primary Examiner*—Robert L. Lindsay, Jr.
*Attorney, Agent, or Firm*—Michael J. Striker

[57] ABSTRACT

Process for the production of water containing water glass fibers of the type in which alkali water glass is dry spun into water containing fibers, the improvement being dry-spinning water glass free from non-alkaline compounds having a molar ratio of alkaline oxide to silicon dioxide of from about 1:3 to 1:1.9 and a viscosity of about 10–700 Pa measured at 30° C., at 10°–50° C. in a drying funnel of a temperature of more than 100° C., at a discharge velocity of minimum 5m/min.

10 Claims, No Drawings

METHOD FOR MAKING SILICA FIBERS

This is a division of application Ser. No. 110,002, filed Jan. 7, 1980.

BACKGROUND OF THE INVENTION

The invention relates to hydrated fibers predominantly consisting of water glass, processes for their production by the dry-spinning principle and further processing into silica fibers, silica fibers as such, and their utilization, especially in friction linings as used for instance in automatic transmissions, as lining for clutches and brakes etc.

Water glass fibers are in the category of inorganic fibers, and have been known, per se, for some time. The British Pat. No. 352,681 note a number of inorganic fibers that may be obtained from different silicates, wherein the silicates contain, apart from the alkaline metals also other metals such as aluminum, magnesium etc. A number of processes for the production of such fibers have been noted, f.i. the wet spinning process. Without further information on the composition of the spinning stock and the spinning conditions, the so-called dry spinning process is also made mention of.

In the U.S. Pat. No. 2,338,463, the production of, respectively, silica fibers or quartz-glass fibers is described. Water-glass fibers will result herein as intermediate product which may be produced by various processes such as the melt extrusion process, the wet spinning process or the dry, spinning process. Spinning of a so-called double water glass by the dry spinning process is described in example 2 of these patents, the double water glass being a water glass containing equimolar quantities of $K_2O$ and $Na_2O$.

In after-treatment relating to the example, it has, however, become evident that the composition described therein is solid at room temperature and thus cannot be spun. If the temperature of the stock is raised, so that it becomes extrudable, considerable difficulties will result at the spinning die. Lumps or droplets will form and clog the discharge side of the die within a short time.

The U.S. Pat. No. 2,969,272 also describe a further process for the production of inorganic fibers by dry spinning of silicates from aqueous solutions. In the process described therein, it is of disadvantage that the silicates as used contain additional metallic oxides which may be causing defects during subsequent treatment. With the process as per U.S. Pat. No. 2,969,272, relatively low limits are also imposed upon the spinning velocity.

Although a number of remarks relating to the production of water glass fibers by the dry spinning process are already present in literature, the need exists for improved production processes that will be defect-prone to a lesser extent and yield fibers with improved properties.

It is therefore the task of the invention to make available a process less defect-prone than the processes known hitherto and allowing a high spinning velocity. It is furthermore the task of the invention to enable the production of water glass fibers using aqueous solutions for spinning which are free from non-alkaline metallic compounds such as compounds of aluminum, boron, magnesium, zinc, calcium etc., and with which it will not be necessary to add such compounds, as noted in the U.S. Pat. No. 2,969,272, in order to make the stock suitable for spinning.

It is furthermore the task of the invention, to make available hydrated water glass fibers of good mechanical properties such as high tear strength and a favorable modulus of elasticity, which can be processed into very pure silica fibers and which will be suitable as reinforcing inserts for various materials. And it is furthermore a task of the invention to make available water glass fibers that may readily be reeled up after spinning and that may, without any further measures, be treated with preparations of various types as needed for further treatment.

Fibers on the basis of silicium dioxide or silica respectively, containing apart from silicium, oxygen, and smaller quantities of water, with practically no other constituents such as metallic compounds, are to be understood as silica fibers within the purview of the present invention.

Silica fibers and silicium dioxide fibers respectively, have been known for a long time. They may be produced, f.i., by spinning of a melt containing $SiO_2$. Since a process of this type will require temperatures from approximately 2000°–2100° C., special high-temperature resistant apparatus is required and the technical expenditure will be high so that the prices for such fibers will be relatively high.

Glass fibers as f.i. described in the German DE Letters of Disclosure No. 2 609 419 may also be leached with acids. This process is very cumbersome and labor-intensive, the long leaching times detracting from the mechanical properties and it is, furthermore, difficult to quantitatively remove the cationic constituents.

Filaments have already been spun from solutions such as solutions of hellulosic xanthogenates containing dissolved sodium silicate, as can be seen from French Pat. No. 1,364,238, or hydrolized tetra-alkoxy silicones in the presence of polyethylene dioxide, as described in the German DE Letter of Disclosure No. 2,041,321. It is of disadvantage with processes of this type that, inter alia, they are working with an organic auxiliary substance which becomes lost during a protracted process of pyrolysis thus leading to a considerable increase in production cost.

The Great Britain Pat. No. 352,681 discloses dry spinning water glass and other soluble silicates, with subsequent treatment in various baths containing acetone, salts or acids. Concrete instructions for the process, especially how to obtain, at first, water glass fibers suitable for subsequent treatment and pure $SiO_2$ fibers thereupon, are, however, lacking herein.

Thus the need still exists for processes by which pure silica fibers with valuable properties may be produced from water glass in a simple and advantageous manner.

It is therefore a further task of the invention, to make available a process by which silica fibers with good mechanical properties and essentially free from non-alkaline metallic compounds and with manifold uses, may be produced in a simple manner from water glass fibers obtained with the use of commercial-grade water glass. A process, in which the aforenamed disadvantages will not be present, is a further task of the invention.

Friction linings of the type as named afore, should have a comprehensive number of properties. It is. f.i., required that the friction lining will be heat-resistant to a high degree, since, when used as brake lining, it will have to absorb braking energy with temperatures up to 1100° C. developing therein. It should be highly resistant to abrasion in order to have a high life of the friction linings.

Furthermore, the friction lining must be readily workable so that it may be brought into the desired shape without any difficulties. Finally it is often also desirable that it will allow roughening on one or more sides so that, in given instances, the material may be attached to a substrate such as, f.i., a metallic support by means of a bonding agent.

A large number of friction linings have already become known, having the aforenoted properties to a more or less satisfactory extent. Yet, the need still exists for improved friction linings that can be produced in a simple manner and that may be used in manifold applications.

In most of the known friction linings, asbestos is used as the fibrous constituent, but due to reasons of environmental protection, considerable concern has been voiced recently, directed against its use; asbestos is said to be inimical to health and to be causing or promoting cancer in particular. Legislative measures are therefore expected having the objective of either fully prohibiting the use of asbestos within a foreseeable time, or to preclude it to a far-reaching extent. Entirely apart from this, asbestos is a resource not available in unlimited quantities.

Thus, the need continues to exist for friction linings in which asbestos will no longer be the fibrous constituent.

It is therefore a further task of the invention, to make available a friction lining composed without the hitherto usual asbestos fibers, which may be fabricated in a simple manner and which has good properties of use. A further task of the invention is a friction lining having good thermal stability, in which the reinforcing fibers used have a good bond with the imbedded material, having good abrasion resistance, being distinguished by a particularly homogeneous construction, of a long life, and which, when used as brake lining will not cause the usual screeching noises. And a further task of the invention is a friction lining of manifold applications with a low aggressiveness towards the counter material and having a high friction number with coefficients of dynamic and static friction that are of a favorable ratio relative to each other.

SUMMARY OF THE INVENTION

The object of the invention is a process for the production of silicate fibers by treating water glass fibers with acidic or saline solutions, characterized by treating dryspun, hydrated sodium silicate fibers essentially free from non-alkaline metallic compounds and with a molar ratio of $Na_2O$ to $SiO_2$ of approximately 1:3 to 1:1.9, with aqueous hydrogen ions-bearing acidic or saline solutions in order to obtain conversion of the sodium silicate into silicate, washing and drying the silicate fibers thus obtained and, in given instances, thermally treating the latter thereafter.

The relative water glass fibers are preferably produced by a process for the production of hydrated water glass fibers by dry spinning and concomitant drawing of aqueous solutions of water glass, characterized by using as spinning stock aqueous solutions of water glass essentially free of non-alkaline metallic compounds, of a molar ratio of $Na_2O/SiO_2$ of approximately 1:3 to approximately 1:1.9 and a viscosity of approximately 10 to 700 Pa.s taken at 30° C., extruding these in a dry-spinning tunnel of a prevailing temperature of more than 100° C. through die orifices at a discharge velocity of $v_1$ = minimum 5 m/min, and drawing off the resulting filament at a drawing-off velocity $v_2$, so that the stretch ratio $v_2:v_1$ will be a minimum of 6. The spinning stock will preferably be of a temperature of 20°–35° C. It will be favorable if the spinning stock is of a viscosity of approximately 100 to 400 Pa.s. The drawing-off velocity will suitably be at a minimum of 60 m/min, minimum 350 m/min preferable.

The content of sodium oxide in the aqueous solution may be substituted by potassium oxide, by up to 30 Mol percent.

The water glass fibers as per invention are distinguished by a water content of approximately 15 to 30, preferably 25 to 30 percent by weight; their tear strength is approximately 5 to 30 cN/tex, preferably 15 to 25 cN/tex. They are of a ratio of $Na_2O$ to $SiO_2$ of approximately 1:3 to 1:1.9. They are amorphous and have a density of about 2.2 g/cm$^3$.

The object of the invention is, furthermore, utilization of the water glass fibers as per invention in the production of silica fibers which can be achieved, f.i., by treatment with an aqueous acid such as hydrochloric acid or sulfuric acid.

Water glass is an industrial-scale product, used to designate the glassy, water-soluble potassium or sodium silicates solidified from the melt, or their aqueous solutions, and which contain 2 to 4 Mol $SiO_2$ per one Mol alkaline oxide.

Is was a particular surprise, that commercial-grade water glass solutions could be converted by the process as per invention into fibers, the only stipulation being that the conditions noted above be adhered to. With water glass solutions of too low an $Na_2O$ content, it is readily possible to adjust the molar ratio of $Na_2O$ to $SiO_2$ as desired, merely by effecting an addition of NaOH. The viscosities required can be adjusted as desired by simply concentrating the solution, f.i. by evaporating excess water. Viscosity can be determined with a customary rotatory viscosity meter at 30° C.

It is furthermore important that the temperature of the spinning stock be not considerably above 50° C., as otherwise perfect spinning cannot be ensured at all times.

Production of the spinning solution should take place in an atmosphere free, as far as possible, from $CO_2$.

The length of the spinning funnel may vary over a comparatively wide range; suitable lengths are, f.i., 1.5 to 8.0 m.

The conditions in the spinning funnel such as length, temperature and air supply can be adjusted as appropriate. It is possible to additionally supply a carrier gas such as hot air or inert gases for drying of the filament in the funnel. Attention must be paid herein that the water content of the water glass fibers leaving the spinning funnel will be within approximately 15 to 30 percent by weight.

The discharge velocity of the spinning stock from the orifice should be at a minimum of 5 m/min. It may, of course, be increased as required. It is important that the stretch, i.e. the ratio of drawing-off velocity to discharge velocity be at least 6. It has been found that with an increased stretch, the strength of the water glass filament as obtained will also increase. With a ratio of 13.3 (drawing-off speed 200 m/min) a strength with an individual titer of of 9.3 dtex was obtained amounting to 7.5 cN/tex. With a ratio of 49.0 (drawing-off speed 500 m/min) the tear strength will amount to 19.0 cN/tex.

Devices, as customary with the known dry-spinning processes may be used as spinning funnels.

The diameter of the die bores may vary within the usual limits. Suitable diameters are, f.i., 125 μm, 160 μm and 250 μm. Larger diameters are suitable as well.

The freshly spun water glass filament may be reeled up directly without applying a preparing agent.

Reeling-off, however, may require application of a suitable preparation for obtaining an appropriate cohesion of the filament. It was a surprise that aqueous preparations, f.i. cationic active surfactants, such as water-soluble surfactant ammonia compounds, facilitating the further textile processing of the filament, could also be used herein.

The water glass fibers as per invention may be converted into silica fibers in a particularly simple manner, f.i. by treatment with diluted mineralic acids. Using water glass fibers with a titer below 5 dtex, it will already suffice if the fibers are treated with n HCl for one minute and at 25° C. After acid treatment, the fibers are washed with water to become free of ions and dried.

This method of production has the advantage of a shorter treatment time when compared to obtaining silica fibers from glass fibers.

Water glass fibers as well as silica fibers obtained by the requisite use of water glass fibers may well be made into flat structures.

It will be favorable if approximately 0.5 to 5.0 n aqueous hydrochloric acid at room temperature are used as the acid for treatment. N hydrochloric acid at a temperature of approximately 20° to 90° C. may also be used as acid. Aqueous acidic solutions, adjusted to a pH value of 1 to 8, containing ammonium chloride and at least 1 normal relative to the content of chloride ions, are also very suitable for treatment.

Temperatures of 200° to 1000° C. are suitable for the thermal after treatment, with the range from approximately 500°–1000° C. being preferred. A particularly suitable range is located between 600° and 900° C.

The silica fibers as per invention may, without any further measures have tensile strengths of 200 to 800 $N/mm^2$ or above, and a modulus of elasticity of $10\cdot10^3$ to $80\cdot10^3$ $N/mm^2$.

The fibers as per invention are particularly suitable for the production of staple fiber. Thus, they lend themselves very well for being made into wet webs.

Fibers as per invention may also very well be utilized for the production of filter material and as reinforcing material.

The water glass fibers obtained by the dry spinning process may be fed into the treatment bath immediately after having been drawn off from the spinning funnel, and may be continuously led through the bath. It is also possible, first to reel up the water glass fibers and to treat them with the acidic or saline solution only thereafter.

Usual inorganic or organic acids may be used for the treatment. Aqueous hydrochloric acid, diluted sulfuric acid, diluted phosphoric acid etc. may be used. The diluted acids are preferably used in the middle range of concentration; in the higher range of concentration, with hydrochloric acid. f.i., from approximately 10 n, it may occur that the water glass fibers will disintegrate so that formation of a coherent structure of the silica fibers will no longer take place.

Finding suitable concentrations for the individual acids will merely require skill, and may be determined by an average expert in just a few experiments, and without any expenditure towards an invention.

Aqueous saline solutions containing hydrogen ions, are also suitable for the conversion of the water glass filament into a silica filament; particular mention is to be made of the salts of ammonia such as ammonium chloride or ammonium sulfate, with ammonium chloride being preferred. Aqueous solutions may be used, containing only ammonium chloride and are weakly acidic; solutions may also be used additionally containing hydrochloric acid and adjusted, for example, to a pH value of 1; these solutions may also be adjusted to a pH value of approximately 8 by the addition of ammonia.

The filaments are washed after treatment, with preferably distilled or fully desalinated water being used, washing being performed until the washing water is free from ions, drying of the filament subsequently ensuing at room temperature or increased temperature.

The dried filament has a remaining water content of approximately 10%. The filament may aleady be used as such.

The filament may be subjected to thermal after treatment after drying which, surprisingly, will considerably improve strength, and it has been possible in part to increase the strength threefold or by a multiple. Such treatment may be performed in customary annealing ovens in a continuous way.

During this process, a certain shrinking of the filament will take place.

The temperature should be maintained at minimum 200° C., preferably minimum 500° to approximately 1000° C., a particularly suitable range lies between 600° and 900° C. Treatment may be made in air or in an inert-gas atmosphere.

The fibers produced as per invention lend themselves very well to the production of so-called staple fiber. This may be obtained, f.i., very well by wet comminution. Herein, freshly precipitated filament washed in water, so-called hair balls, is suspended in water and brought to a staple length of average 2 to 4 mm by a rotating shredder.

These staples may readily be dispersed in water and processed in a web.

Fibers as per invention are very suitable for the production of customary filter material. They are also highly usable as reinforcement material, f.i. as reinforcing fibers in composite materials.

It was a particular surprise that the process as per invention allowed the production of silica fibers with such outstanding mechanical properties in such a simple manner. The treatment time with acid or with the saline solution is very short, fibers of excellent purity will be obtained. Also worth mentioning are the high tear strengths, the high resistance to temperatures and the good insulating properties. Furthermore, the fibers possess interesting surface properties. Thus, large surfaces, f.i. 380 $m^2/g$ could be determined by the customary BET method.

The process allows obtaining a valuable fiber from cheap and amply available water glass. The process as per invention is friendly to the environment; organic auxiliary substances that will be lost, such as cellulose or polyethylene oxide need not be used. The fibers obtained are of manifold uses.

A further object of the invention is a friction surface composed in essence of a fiber material, a polymeric binder compound, filler agents and, in given instances, other additives, which is characterized by the fiber material consisting wholly or in part of silica fibers. The fibers used as per invention in friction linings, will have been obtained, preferably, by dry spinning of sodium silicate and treating the sodium silicate fibers with aqueous hydrogen-ions containing acidic or saline solutions to convert the sodium silicate into silica. The silica fibers may have a tensile strength of approximately 200 to 800 N/mm$^2$ and a modulus of elasticity of $10 \times 10^3$ up to $100 \times 10^3$ N/mm$^2$. The silica fibers will preferably be used cut into staples and have a staple length of approximately 1 to 40 mm, silica fibers with an initial staple length of 5 to 15 mm being particularly suitable. The content of silica fibers in the friction surface may amount to, f.i., 5 to 70 percent by weight.

It will be appropriate if the fiber material contains also other fibers apart from silica fibers, be it in the form of a fiber mixture or by the fiber material having been produced from two or more types of yarn of respectively different fibers. The following combinations of fibers are very suitable; silica fibers and polyacrylonitrile fibers, silica fibers and carbon fibers, silica fibers and viscose fibers, and particularly silica fibers and fibers of fully aromatic polyamides and silica fibers and metallic fibers, particularly steel wool. Metallic fibers are also of advantage when an additional fiber content of the aforenamed types is already present apart from the silica fibers.

In a particularly advantageous embodiment of the invention, friction linings are obtained by pressing of silica-containing stock in the form of small rods.

The friction material as per invention is preferably used as friction lining in disc and drum brakes, as friction lining in clutches and as disc material in multiple disc clutches.

Fibers containing as their main comstituent SiO$_2$ or polymeric silica, as, formally considered, obtained by the condensation of ortho silicon dioxide, are to be considered as silica fibers within the purview of the present invention. The transition between highly condensed silica and the pure SiO$_2$ is fluid.

The silica fibers of the present invention will preferably have an SiO$_2$ content of more than 95 percent by weight when in dehydrated state, preferably even more than 98 or even 99.5 percent by weight and more.

Hydrated fibers or such containing SiOH groups may be used, the latter resulting from sodium silicate fibers after treatment with diluted hydrochloric acid and drying at temperatures of up to approximately 120° C. Preference is however given to practically water-free silica fibers poor in SiOH groups, that have been annealed at temperatures above 800° C. The fibers will, preferably, be practically free from other oxides such as Al$_2$O$_3$, MgO etc.

In given instances, the production of silica fibers to be used in friction linings can also be made by leaching glass fibers with acids. Within the purview of the invention, preference is, however, given to the use of silica fibers obtained by dry spinning of sodium silicate into water glass fibers and subsequent treatment of water glass fibers with acidic compounds.

Fibers as such, i.e. fibers with limited length, meaning staple fibers, and fibers of practically endless length, meaning filament, also fibers in the form of mats, webs, felts, bundles or tow, yarns, threads, rope, ribbons, fabrics etc., are to be understood as fiber material within the purview of the invention.

Silica fibers may be used within the purview of the invention in the most varied modes, it is, e.g. possible the fibers cut into staples of uniform or dufferent length. Suitable lengths of fibers are 3, 6, 12, and 24 mm. Bundles of short staple are predominantly used in brake linings.

The fibers may also be used as filament, yarm rope, etc. Use as fabric or webs is also possible. Yarn is mainly used in the production of clutch linings, webs are mainly used in friction linings as used in automatic transmissions.

Stock in the shape of small rods, containing silica fibers may be obtained when silica fibers are admixed with binders, fillers, solvents and, if needed, further additives, extruding the mixture through a calibrating die and cutting, or granulating respectively, the extrudate after removing the solvent. The small rods, or particulates in the shape of leaves or granulate may then be shaped into friction linings in a simple manner by pressing at appropriate temperatures.

The silica fibers may be used alone, or under conjoint use with one or more of the abovenoted fiber types; additions of metallic fibers or wires are favorable if, apart from the silica fibers, other fibers are also present.

When using several fiber types, the purview of the invention permits proceeding from a fiber mixture obtained by simple mixing of silica fibers with other fibers. It is, however, also possible to process different fibers without previous mixing, f.i. by initially producing a yarn from silica fibers and another yarn from, e.g., fully aromatic polyamides and by further processing these different yarns together into, f.i., a thread. It is also possible to stack together yarns of silica fibers and, for instance, fully aromatic polyamides, subsequently cutting these together in order to obtain a thorough mixture. It has been proven that steel wool used in combination will be very suitable for brake linings. Brass wire is very favorable as addition for friction linings used in clutches. Thermal conductivity and friction value may be influenced to advantage in this manner.

Fully aromatic polyamides are to be understood as so-called aramides, obtained from aromatic dicarbonic acids and aromatic diamines, or, aromatic amino-carbonic acids respectively.

Usual polymeric compounds may be used as binder or matrix into which the fiber material is imbedded and which serves as reinforcement. Known are resins on the basis of phenols, obtained, f.i., by the condensation of phenol and aldehydes such as formaldehyde and acrolein. It is also possible to use as binder melamine resins and similar. The customary solvents may be used. The friction lining as per invention may contain the usual fillers such as carbon black, metallic oxides, kaolin, etc., conjoint processing of the usual additives is possible. Utilization of polytetrafluorothylene as binder compound is also possible.

Shaping into friction linings of usual circular, plate, block or cuheiform shape such as discs, rings, blocks, may be made by methods as known per se.

Also further mechanical fabrication, such as the provision of recesses or cutouts may be made, in the customary manner.

Usual fillers, binders, additives and corresponding production methods have been described repeatedly in literature. In this context, reference may be made to the series of articles "Development of friction linings for clutches and brakes" by H. Bohmhammel in the periodical "Gummi, Asbest, Plastics" of the years 1973 and 1974, wherein details of the production of friction linings are given.

The silica fibers may be used in friction linings without any special preparation. It is however also possible to apply a special preparation to the fibers before imbedding. Polyurethanes, epoxy resins, latices and phenolic resins on the basis of phenol and formaldehyde are among the preparations that have particularly proved themselves within the purview, of the invention. It will generally suffice to provide the fibers to be used with 1 to 7 percent by weight of the preparation.

Production may then be made in the manner known per se. It is thus possible to produce a yarn, a rope, a mat, a web, a fabric or similar structures by using silica fibers, in given instances with conjoint use of other fibers, to impregate these structures with the binder material and then to shape from this stock, e.g. by pressing, removing in case of need solvent that may still be present, an appropriate formed structure, f.i. a disc or a block. Fabricating, by pressing, of stock in the shape of small rods, which contains silica, is of particular advantage.

The discs may then be used as such, or, respectively, after having been brought onto a substrate.

It was a particular surprise that the friction linings as per invention could be used with such advantage as friction linings in brakes and clutches. They are, furthermore, verywell suitable as discs in so-called multiple disc clutches.

The friction materials may be readily be machined, it is readily possible to bring them into a desired shape by grinding, boring, milling etc. Deburring, machining of grooves or spiral-shaped recesses is possible without difficulties.

A disc made from the friction lining as per invention, may readily be roughened so that it may firmly be attached with its roughened side to a side of a substrate that may also be roughened, by means of a bonding agent. Bonding between substrate and friction material is excellent.

Friction materials as per invention are very resistant against the influence of heat, show little abrasion and thus a high life when used as clutch and brake linings. The material is of high elasticity and of high friction values under static as well as dynamic stresses. The frequently usual screeching will not occur any more with brakes having brake linings of the friction material as per invention.

The friction lining is non-aggressive toward counter materials such as e.g., steel or castings. Bonding between silica fibers and binder is excellent as the former has favorable surface properties and good wettability, this becoming evident in a good homogenity of the friction lining. The frictional properties allow very short shifting times in synchronized transmissions. Compatibility of silica fibers with the other materials used is also very satisfactory.

The friction linings have good bursting properties and high bursting strength as demanded, above all, for clutch linings.

The novel features which are considered as characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLES 1-3

Preparation of the spinning solution is made in an atmosphere practically free from $CO_2$. Using a stainless steel preparing vat fitted with a heating jacket, an anchor-shaped agitator, filling spout and drain cock at the bottom, a mixture of 2200 g Sodium silicate of 39° Be, mol ratio $Na_2O/SiO_2 = 1/3.38$ and 85.5 g NaOH is concentrated at 70° C. and 200 mbar until a viscosity of 240 Pa.s measured at 30° C. has been reached. Adding sodium lye, the mol ratio $Na_2O/SiO_2$ is raised to 1/2.48. The stock is suitable for spinning after filtering through a batiste cloth.

The preparing vat is connected to a spinning apparatus, consisting in essence of a gear pump, a die plate with 24 circular bores with a diameter of 125 $\mu$m and a dry-spinning funnel of 8 m length.

The bracket for the die plate, and the supply line, also have a heating jacket. At spinning, the temperature of the spinning solution should be 30° C. The filament exiting from the die is stretched in the vertical spinning funnel and reeledup at the foot of the funnel. Air, heated to approximately 150° C., rising in a counterflow, serves as carrier gas.

The water glass yarns produced in the examples 1 to 3 at different drawing-off velocities have the following tear strengths:

| Example No. | Die-exiting velocity m/min | Draw-off velocity m/min | Stretch | Tear strength cN/tex |
| --- | --- | --- | --- | --- |
| 1 | 15.0 | 200 | 13.3 | 7.5 |
| 2 | 15.0 | 350 | 23.3 | 11.1 |
| 3 | 10.2 | 500 | 49.0 | 19.0 |

The water glass filaments of example 3 have a water content of 21.5 percent by weight and a density of approx. 2.2 g/cm$^3$. The individual titer is 2.3 dtex, the diameter approx. 10 to 16 $\mu$m, and the modulus of elasticity of 1800 cN/tex.

EXAMPLE 4

Example 4 describes the application of a preparing agent. Sodium silicate is spun according to the data of example 2, the stretch is 23.3.

Using a preparation bobbin, the water glass filament is prepared with a 10 percent aqueous solution of a surfactant salt of ammonia (G 3634 of Messers. Atlas Chemie). With an application of the preparation of approx. 0.8%, the water glass yarn consisting of 24 individual filaments may be reeled off in a satisfactory manner and, e.g., processed in a continuous manner into silica filament.

EXAMPLE 5

Example 5 describes the production of silica filament from water glass filament.

A water glass yarn consisting of 24 individual filaments, produced as per example 3 with a draw-off velicity of 500 m/min, is submerged into n HCl at 25° C. for one minute. The filament is then used with distilled water until the washing water is free from Cl ions and allowed to dry in air. The material contains less than 0.01% Na.

With an individual titer of 1.6 dtex, the tear strength of the yarn is at 5.8 cN/tex. Tear elongation is 1.8% and the filament diameter approx. 8 to 15 μm.

EXAMPLE 6

The initial material is a hydrated water glass yarn with 60 individual filaments, produced as per example 1.

Differing from the latter, the die plate used herein has, however, 60 bores. At a stretch (=draw-off velocity/die exiting velocity) of 28.7, the filament is reeled up at a velocity of 350 m/min.

Yarn pieces of 1 m length taken from the spool are submerged in n HCl of 25° C. for one minute, washed with distilled water until the washing water is free from Cl ions and dried in air. The Na content of the silica filament thus produced is below 0.01%. The diameter is 12.7 to 19.9 μm. Strength testing of individual filaments brought the following data:
Maximum elongation: 2.0%
Tensile strength: 215 N/mm$^2$
Modulus of elasticity: 11000 N/mm$^2$

EXAMPLE 7

Silica filament produced as per example 6 are exposed in an annealing oven to a temperature of 750° C. for 20 min, whereby the water content will be reduced from approx. 10 to less than 1%. Determination of the mechanical properties of individual filaments yields the following data:
Maximum elongation: 1.0%
Tensile strength: 630 N/mm$^2$
Modulus of elasticity: 76000 N/mm$^2$

EXAMPLE 8

Example 8 describes the conversion of water glass fibers into silica fibers, using a saline solution of increased pH.

Use is made of hydrated water glass filament as noted in example 6.

N hydrochloric acid, adjusted to pH 8 with 25 percent ammonia, is used for the conversion into silica fibers. The time for the filament to remain in the treatment bath is 15 min. If a large excess of saline solution is used, it will not be necessary to adjust again the pH value later on by, f.i. the addition of n HCl.

The silica filament thus produced is washed until neutral with water and dried in air. The individual filaments have the following mechanical properties:
Maximum elongation: 1.9%
Tensile strength: 290 N/mm$^2$
Modulus of elasticity: 11000 N/mm$^2$

EXAMPLE 9

Production of a friction lining for clutches

A mixed thread is produced with a volumetric ratio of 1:1, from a yarn of silica fibers and a yarn from fully aromatic polyamides, having a total titer of 12,000 dtex. Yarn twist is 120 turns per meter, thread twist 150 turns per meter. Four of these threads are combined to a ribbon and led through a submersing bath containing the usual impregnating mixture. This mixture consists in essence of phenolic resin, natural and synthetic latices, (50 part by weight), as well as carbon black and graphite (20 parts by weight), kaolin (15 parts by weight), zinc oxide (5 parts by weight), and sulfur (10 parts by weight) with ethyl-methyl ketone as solvent.

EXAMPLE 10

Production of a brake lining

A silica-filament yarn and a filament yarn of fully aromatic polyamide are stacked at a volumetric ratio of 2:1 and then cut by means of a customary cutting device into staples of 6 mm length.

30 parts by volume of this staple mixture are mixed with 70 parts by volume of a binder mixture and processed in the usual manner into a brake lining.

The binder mixture contains—all figures cited being parts by volume—phenol-cresol resin (30), synthetic latex (10), baryte (5), a mixture of ground slate/kaolin (10), graphite (5) molybdenum sulfide (5), iron filings mixed with pulverized copper 3:1 (5).

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a process for the production of water-containing water glass fibers of the type in which alkali water glass is dry spun into water-containing fibers, the improvement comprising dry-spinning water glass free from non-alkaline compounds, having a molar ratio of alkaline oxide to silicon dioxide of from about 1:3 to 1:1.9 and a viscosity of about 10 to 700 Pa measured at 30° C., at about 10° to 50° C. in a drying funnel of a temperature of more than 100° C., at a discharge velocity of minimum 5 m/min.

2. The method of claim 1 wherein the alkaline oxide is a mixture comprising from about 70 to 100 molar percent of sodium oxide and from about 0 to 30 molar percent of potassium oxide.

3. The method of claim 1 wherein the alkaline oxide is sodium oxide.

4. The method of claim 1 wherein the water glass fibers have a water content of from about 15 to 30 weight percent.

5. The method of claim 1 wherein the spinning material is at a temperature of from about 20° C. to 35° C.

6. The method of claim 1 wherein the spinning material has a viscosity of from about 100 Pa.s to 400 Pa.s measured at 30° C.

7. The method of claim 1 wherein the water glass fibers have a water content of from about 20 to 50 weight percent.

8. The method of claim 1 wherein the water glass fibers have a tear strength of from about 5 to 30 c$^N$/tex.

9. The method of claim 1 wherein the alkali water glass is an aqueous alkaline silicate solution having a viscosity of from about 10 tl 700 Pa.s determined at 30° C.

10. The method of claim 1 wherein said dry-spinning includes jetting the alkali water glass having a temperature of from about 10° to 50° C. into a chamber filled with a gas of a temperature of more than 100° C. through jets with an exit velocity $V_1$ of at least about 5 m/min and drawing off the resulting fibers with a drawing off velocity $V_2$ providing a stretch ratio $V_2/V_1$ of at least 6.

* * * * *